US012724232B2

(12) United States Patent
Yu et al.

(10) Patent No.: US 12,724,232 B2
(45) Date of Patent: Sep. 1, 2026

(54) COUPLE-IN LENS ASSEMBLY

(71) Applicant: National Central University, Taoyuan City (TW)

(72) Inventors: Jun-Yi Yu, Tainan City (TW); Guan-Wei Huang, Hsinchu County (TW); Wei-Chia Su, Changhua County (TW); Wen-Kai Lin, Taichung City (TW); Shao-Kui Zhou, Taipei City (TW); Yuan-Yan Liang, Changhua County (TW); Ching-Cherng Sun, Taoyuan City (TW); Wen-Hsin Sun, Taoyuan City (TW); Huai-Chih Chang, Kaohsiung City (TW)

(73) Assignee: National Central University, Taoyuan City (TW)

( * ) Notice: Subject to any disclaimer, the term of this patent is extended or adjusted under 35 U.S.C. 154(b) by 248 days.

(21) Appl. No.: 18/623,164

(22) Filed: Apr. 1, 2024

(65) Prior Publication Data

US 2025/0224591 A1 Jul. 10, 2025

(30) Foreign Application Priority Data

Jan. 4, 2024 (TW) ................................ 113100499

(51) Int. Cl.
*G02B 9/64* (2006.01)

(52) U.S. Cl.
CPC ..................................... *G02B 9/64* (2013.01)

(58) Field of Classification Search
CPC ........................................................ G02B 9/64
See application file for complete search history.

(56) References Cited

U.S. PATENT DOCUMENTS

| | | | | |
|---|---|---|---|---|
| 5,299,065 | A | 3/1994 | Watanabe | |
| 10,996,455 | B2 | 5/2021 | Takato | |
| 2016/0178875 | A1* | 6/2016 | Matsumura ............ | G02B 13/18 359/684 |
| 2018/0275379 | A1* | 9/2018 | Cheng ...................... | G02B 9/64 |
| 2021/0003820 | A1 | 1/2021 | Zhang | |

FOREIGN PATENT DOCUMENTS

| | | | |
|---|---|---|---|
| CN | 1896798 | A | 1/2007 |
| CN | 104267492 | B | 8/2016 |
| CN | 112068290 | | 12/2020 |
| CN | 114706198 | A | 7/2022 |
| CN | 115933129 | | 4/2023 |
| EP | 2579082 | A1 | 4/2013 |
| JP | 2023-130687 | A | 9/2023 |
| TW | I537595 | B | 6/2016 |
| TW | M597875 | U | 7/2020 |
| TW | I732988 | | 7/2021 |
| WO | 2022/147911 | A1 | 7/2022 |

* cited by examiner

*Primary Examiner* — Charles S Chang
(74) *Attorney, Agent, or Firm* — CKC & Partners Co., LLC

(57) ABSTRACT

A couple-in lens assembly includes a first lens, a second lens, a third lens, a fourth lens, a fifth lens, a sixth lens, a seventh lens, an eighth lens and a ninth lens. The second lens is located above the first lens. The third lens is attached above the second lens. The fourth lens is located above the third lens. The fifth lens is located above the fourth lens. The sixth lens is attached above the fifth lens. The seventh lens is located above the sixth lens. The eighth lens is located above the seventh lens. The ninth lens is attached above the eighth lens.

8 Claims, 13 Drawing Sheets

Relative illumination

Relative illumination (%)

100 95 90 85 80 75 70 65 60 55 50 45 40 35 30 25 20 15 10 5 0

0 1 2 3 4 5 6 7 8 9 10 11 12 13 14 15 16 17 18 19 20 21 22 23 24 25

Viewing angle (°)

Distortion curve

COUPLE-IN LENS ASSEMBLY

CROSS-REFERENCE TO RELATED APPLICATIONS

This application claims priority to Taiwan Application Serial Number 113100499, filed Jan. 4, 2024 which is herein incorporated by reference.

BACKGROUND

Technical Field

The present disclosure relates to a couple-in lens assembly, and in particular to a couple-in lens assembly applied to augmented reality systems and virtual reality systems.

Description of Related Art

In recent years, near-eye displays have become predominant in mobile display, and can be incorporated into portable devices such as glasses and head-mounted displays, improving the convenience of display. In the design of the near-eye displays, a couple-in lens assembly in a head-mounted display is especially important as it plays a role of guiding light rays into waveguide components. Therefore, there is a need for designing a couple-in lens assembly which can be incorporated into a head-mounted display.

SUMMARY

A technical aspect of the present disclosure relates to a couple-in lens assembly, and in particular to a couple-in lens assembly applied to augmented reality systems and virtual reality systems.

According to an embodiment of the present disclosure, a couple-in lens assembly includes a first lens, a second lens, a third lens, a fourth lens, a fifth lens, a sixth lens, a seventh lens, an eighth lens and a ninth lens. The first lens has a spherical first surface and a spherical second surface. The second lens has a spherical third surface and a spherical fourth surface, and is located above the second surface of the first lens. The third lens has a spherical fifth surface and a spherical sixth surface, where the fifth surface of the third lens is attached to the fourth surface of the second lens. The fourth lens has a spherical seventh surface and a spherical eighth surface, and is located above the sixth surface of the third lens. The fifth lens has a spherical ninth surface and a spherical tenth surface, and is located above the eighth surface of the fourth lens. The sixth lens has a spherical eleventh surface and a spherical twelfth surface, where the eleventh surface of the sixth lens is attached to the tenth surface of the fifth lens. The seventh lens has a spherical thirteenth surface and a spherical fourteenth surface, and is located above the twelfth surface of the sixth lens. The eighth lens has a spherical fifteenth surface and a spherical sixteenth surface, and is located above the fourteenth surface of the seventh lens. The ninth lens has a spherical seventeenth surface and a spherical eighteenth surface, where the seventeenth surface of the ninth lens is attached to the sixteenth surface of the eighth lens.

In an embodiment of the present disclosure, the couple-in lens assembly further includes an aperture. The aperture is disposed and attached on the eighteenth surface.

In an embodiment of the present disclosure, the first lens includes a divergent lens.

In an embodiment of the present disclosure, the fourth lens includes a convergent lens.

In an embodiment of the present disclosure, the seventh lens includes a convergent lens.

Another technical aspect of the present disclosure relates to a couple-in lens assembly, and in particular to a couple-in lens assembly applied to augmented reality systems and virtual reality systems.

According to an embodiment of the present disclosure, a couple-in lens assembly includes a first lens, a second lens, a third lens, a fourth lens, a fifth lens and a sixth lens. The first lens has a spherical first surface and a spherical second surface. The second lens has a spherical third surface and a spherical fourth surface, and is located above the second surface of the first lens. The third lens has a spherical fifth surface and a spherical sixth surface, and is located above the fourth surface of the second lens. The fourth lens has a spherical seventh surface and a spherical eighth surface, and is located above the sixth surface of the third lens. The fifth lens has a spherical ninth surface and a spherical tenth surface, where the ninth surface of the fifth lens is attached to the eighth surface of the fourth lens. The sixth lens has a spherical eleventh surface and a spherical twelfth surface, where the eleventh surface of the sixth lens is attached to the tenth surface of the fifth lens.

In an embodiment of the present disclosure, the couple-in lens assembly further includes an aperture. The aperture is disposed and attached on the twelfth surface.

In an embodiment of the present disclosure, the first lens includes a divergent lens.

In an embodiment of the present disclosure, the second lens includes a convergent lens.

In an embodiment of the present disclosure, the third lens includes a convergent lens.

According to the above-mentioned embodiments of the present disclosure, all lenses are spherical lenses featuring a low cost of implementation as well as advantages of a large amount of light input and a wide viewing angle, and thus can be extensively applied to the design of various head-mounted displays.

BRIEF DESCRIPTION OF THE DRAWINGS

When read with accompanying drawings, the aspects of the present disclosure can be best understood according to the embodiments hereafter. Notably, in accordance with the standard practices of the industry, the features are not drawn to scale. In fact, for clarity of description, the dimensions of the features may be increased or reduced as needed.

DETAILED DESCRIPTION

The content of the embodiments disclosed below presents various embodiments, or examples, used for implementing varied features of the subject matters proposed. Specific examples of components and arrangements are described below for purpose of simplification of the present application. Of course, such examples are merely examples, and not intended to be limiting. In addition, the symbols and/or characters of components can be repeated in various examples of the present application. Such repetition is for purpose of simplicity and clarity, and does not per se specify the relationship between various embodiments and/or configurations described.

For example, spatial relativity terms such as "under . . . ", "below . . . ", "lower", "above . . . " and "upper" can be used herein for facilitating description, to describe the relationship between a component or feature and another component or feature shown in the accompanying drawing. The spatial relativity terms are intended to cover various orientations of a device in use or operation, apart from the orientation depicted in the accompanying drawing. The device can be oriented in other manners (rotation by 90° or others), and the terms for describing spatial relativity herein can be also interpreted accordingly.

Figure 1:
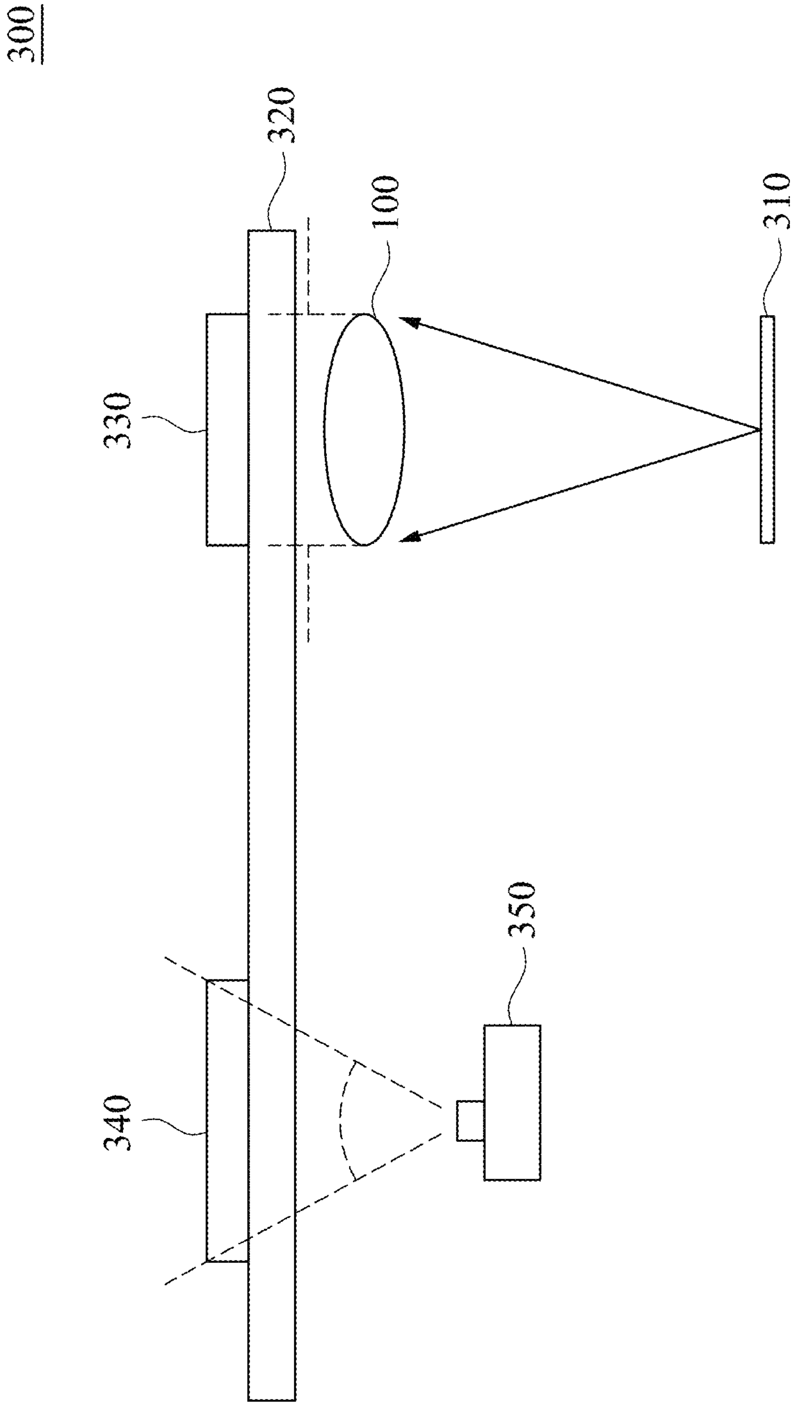
FIG. 1 is a cross-sectional view illustrating a couple-in lens assembly according to an embodiment of the present disclosure applied to a mixed reality display device.

FIG. 1 is a cross-sectional view illustrating a couple-in lens assembly 100 according to an embodiment of the present disclosure applied to a mixed reality display device 300. The mixed reality display device 300 includes a light source 310, a waveguide component 320, a holographic component 330, a holographic component 340, a camera 350 (or observer) and a couple-in lens assembly 100 for coupling light from the light source 310 into the waveguide component 320. The holographic component 330 is configured to couple an image from the light source 310 into the waveguide component 320, and the holographic component 340 is configured to couple the image transmitted in the waveguide component 320 out to the camera 350 (or observer). The couple-in lens assembly 100 will be described in detail hereinafter.

Figure 2:
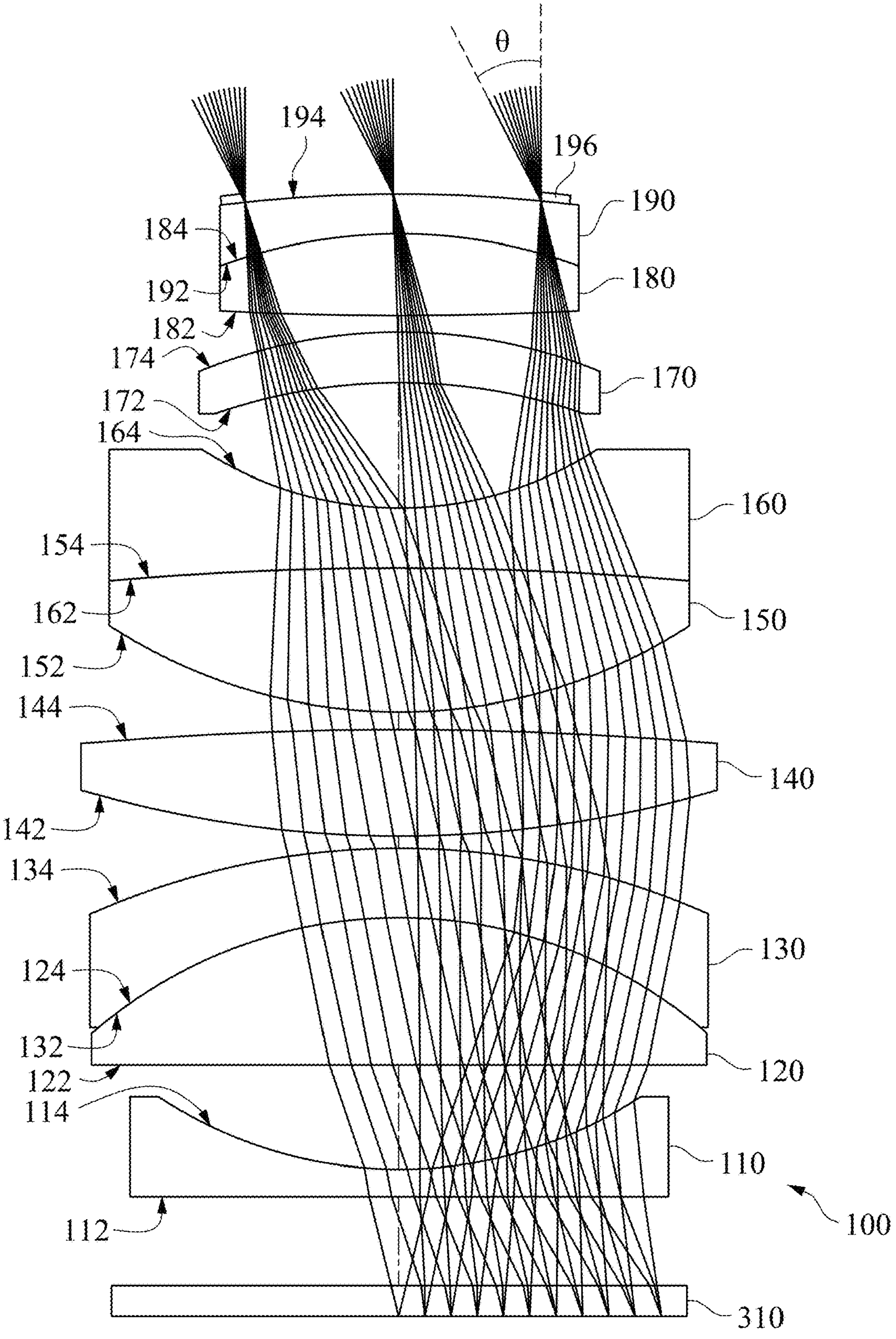
FIG. 2 is a partial enlarged view illustrating the couple-in lens assembly and a light source of FIG. 1.

FIG. 2 is a partial enlarged view illustrating the couple-in lens assembly 100 and the light source 310 of FIG. 1. Referring to FIG. 2, a couple-in lens assembly 100 includes a first lens 110, a second lens 120, a third lens 130, a fourth lens 140, a fifth lens 150, a sixth lens 160, a seventh lens 170, an eighth lens 180 and a ninth lens 190. The first lens 110 has a spherical first surface 112 and a spherical second surface 114. The second lens 120 has a spherical third surface 122 and a spherical fourth surface 124, and is located above the second surface 114 of the first lens 110. The third lens 130 has a spherical fifth surface 132 and a spherical sixth surface 134, where the fifth surface 132 of the third lens 130 is attached to the fourth surface 124 of the second lens 120. Here, "attached" means two lenses are bonded by an optical viscous material such as an optical adhesive, to form an "achromatic lens", which must be explained first. The fourth lens 140 has a spherical seventh surface 142 and a spherical eighth surface 144, and is located above the sixth surface 134 of the third lens 130.

In addition, the fifth lens 150 has a spherical ninth surface 152 and a spherical tenth surface 154, and is located above the eighth surface 144 of the fourth lens 140. The sixth lens 160 has a spherical eleventh surface 162 and a spherical twelfth surface 164, where the eleventh surface 162 of the sixth lens 160 is attached to the tenth surface 154 of the fifth lens 150. The seventh lens 170 has a spherical thirteenth surface 172 and a spherical fourteenth surface 174, and is located above the twelfth surface 164 of the sixth lens 160. The eighth lens 180 has a spherical fifteenth surface 182 and a spherical sixteenth surface 184, and is located above the fourteenth surface 174 of the seventh lens 170. The ninth lens 190 has a spherical seventeenth surface 192 and a spherical eighteenth surface 194, where the seventeenth surface 192 of the ninth lens 190 is attached to the sixteenth surface 184 of the eighth lens 180. In addition, the couple-in lens assembly 100 further includes an aperture 196. The aperture 196 is disposed and attached on the eighteenth surface 194. With such design, the couple-in lens assembly 100 can obtain a larger amount of light input in the same dimension. For example, the couple-in lens assembly 100 has a viewing angle of 50° (FIG. 2 depicts only half of the viewing angle θ, 25° for instance, and the other half of the viewing angle is on the right side of the viewing angle θ).

According to the above-mentioned embodiment of the present disclosure, all lenses of the couple-in lens assembly 100 are spherical lenses featuring a low cost of implementation as well as advantages of a large amount of light input and a wide viewing angle, and thus can be extensively applied to the design of various head-mounted displays.

In some embodiments, the first lens 110 includes a divergent lens. The fourth lens 140 includes a convergent lens. The seventh lens 170 includes a convergent lens. In some embodiments, the fourth surface 124 has the same curvature radius as the fifth surface 132, and thus the two surfaces can form an achromatic lens capable of correcting chromatic aberration. In addition, the eleventh surface 154 has the same curvature radius as the eleventh surface 162. The sixteenth surface 184 has the same curvature radius as the seventeenth surface 192. Moreover, the second lens 120 and the third lens 130 form a first lens assembly, and the first lens assembly includes a convergent lens. The fifth lens 150 and the sixth lens 160 form a second lens assembly, and the second lens assembly includes a divergent lens. The eighth lens 180 and the ninth lens 190 form a third lens assembly, and the third lens assembly includes a convergent lens.

Figure 3:
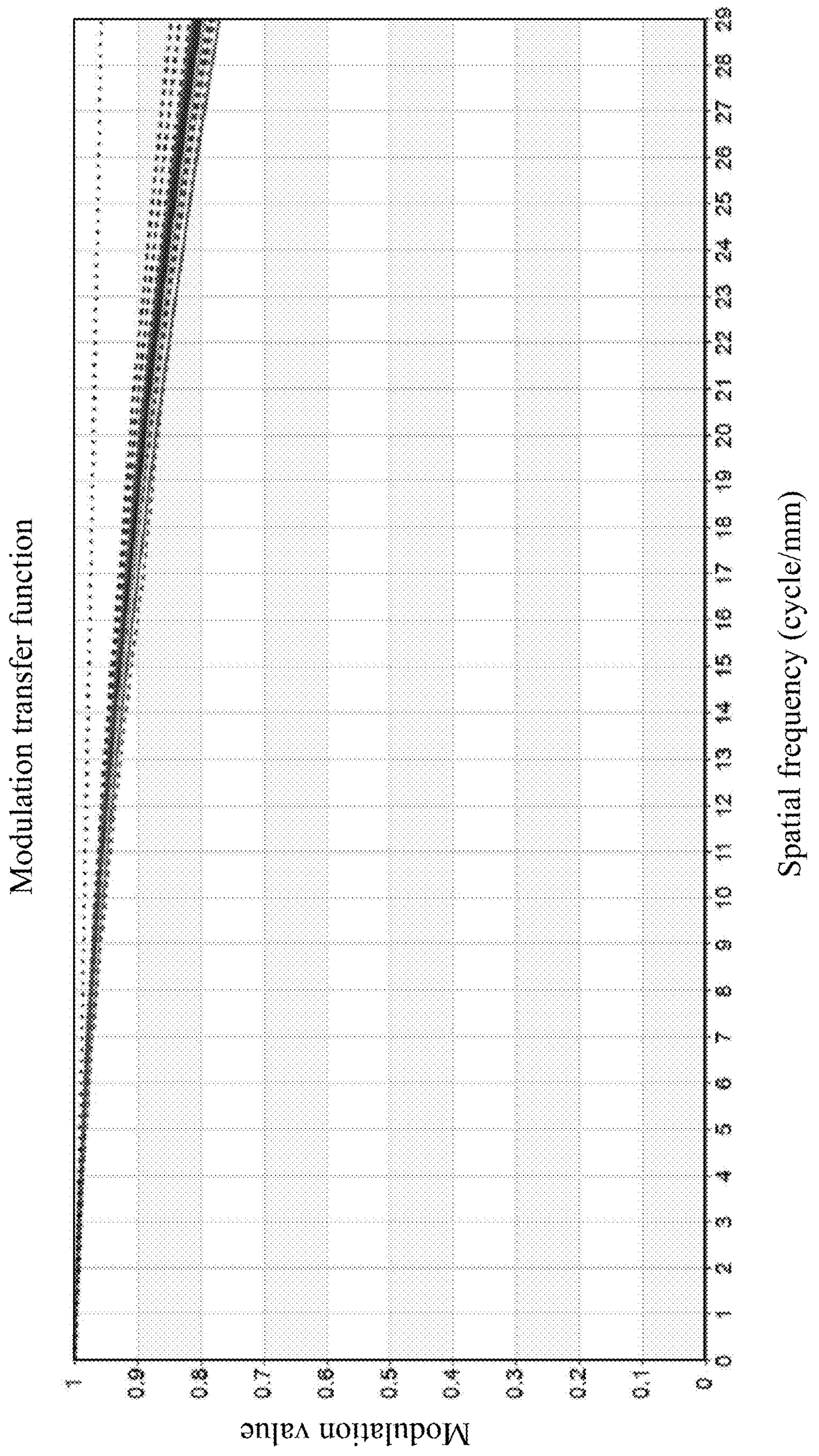
FIG. 3 is a graph illustrating a modulation transfer function of the couple-in lens assembly of FIG. 1.

FIG. 3 is a graph illustrating a modulation transfer function of the couple-in lens assembly 100 of FIG. 1. Referring to FIG. 3, the horizontal axis represents spatial frequency, and the longitudinal axis represents modulation value. Multiple dashed lines drawn in FIG. 3 represent modulation values in the tangential direction (Tangential, T) or sagittal direction (Sagittal, S) of different viewing angles within 25°. A larger modulation value indicates a greater contrast ratio of corresponding lens, and a better ability of distinguishing images. In this figure, in the tangential direction or sagittal direction of whichever angle within the viewing angle of 25°, the modulation value is not less than 0.77 at a spatial frequency of 29, suggesting a significantly high image resolution.

Figure 4:
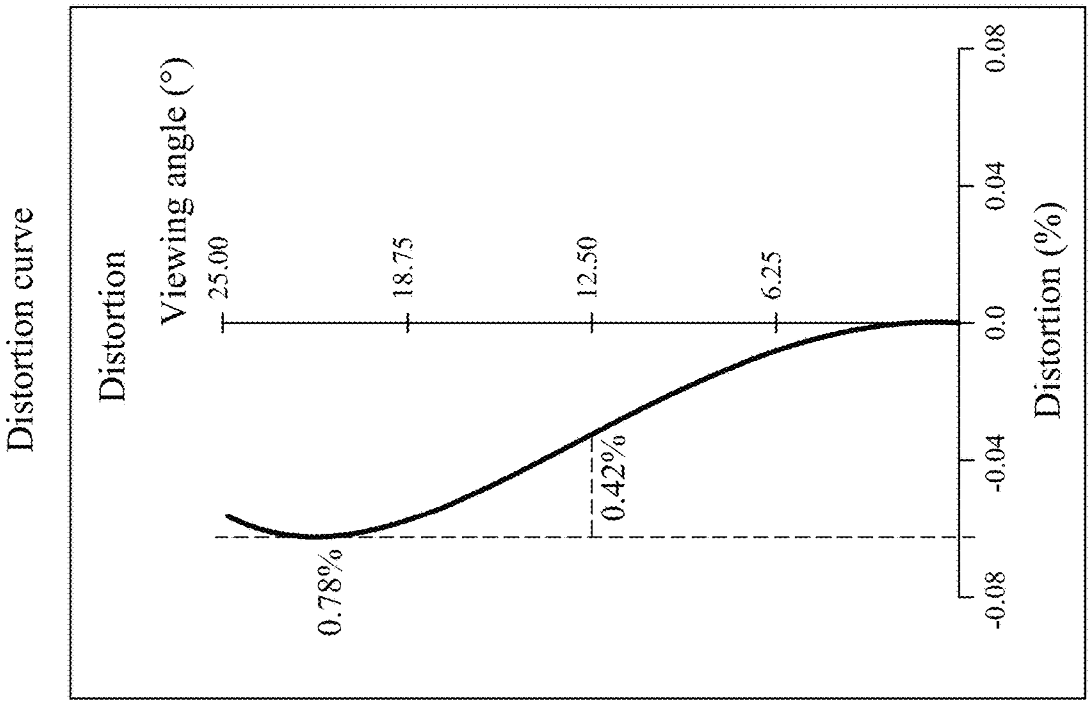
FIG. 4 is a distortion curve-viewing angle relationship diagram of the couple-in lens assembly of FIG. 1.
Figure 5:
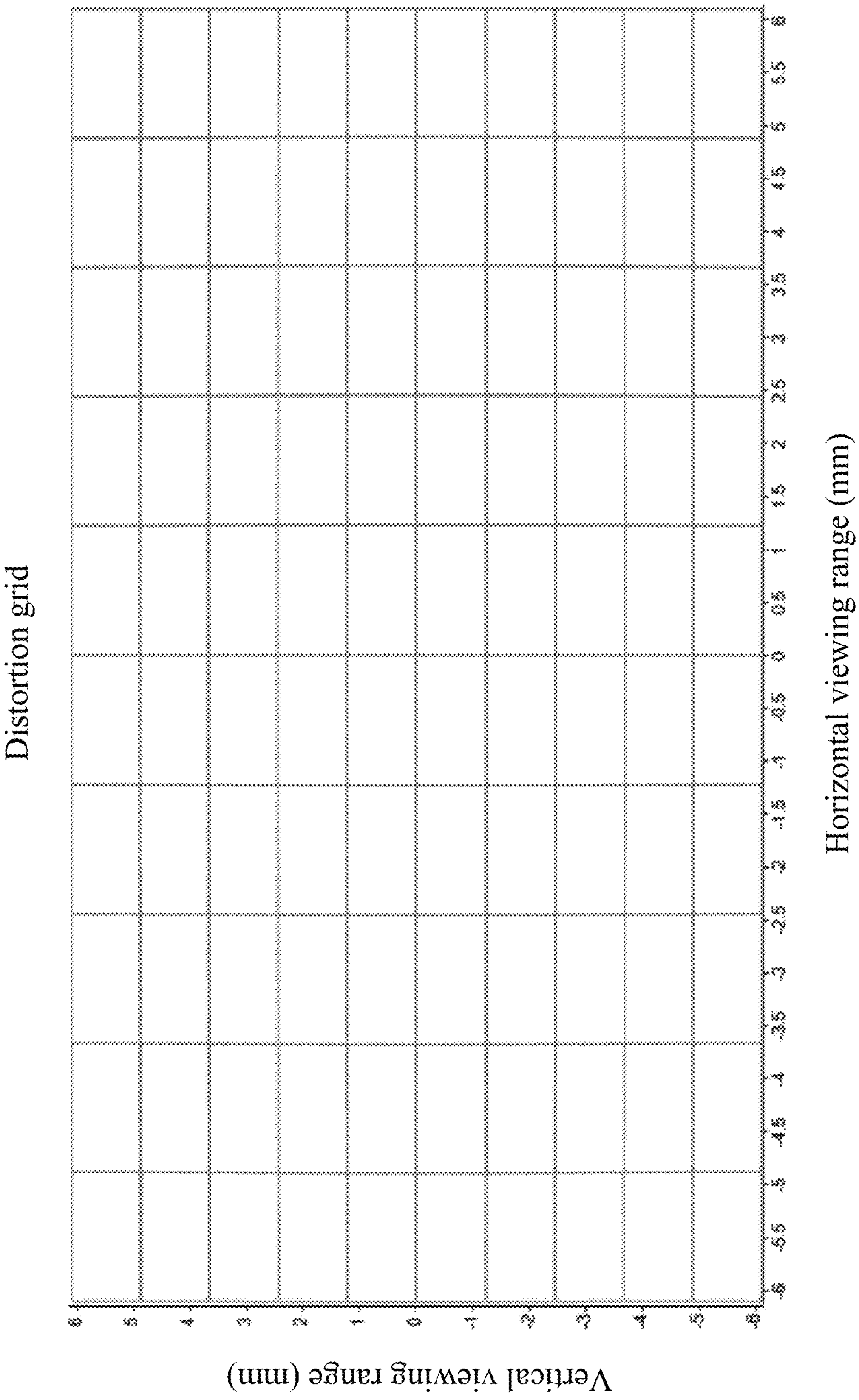
FIG. 5 is a distortion grid diagram of the couple-in lens assembly of FIG. 1.

FIG. 4 is a distortion curve-viewing angle relationship diagram of the couple-in lens assembly 100 of FIG. 1. FIG. 5 is a distortion grid diagram of the couple-in lens assembly 100 of FIG. 1. Referring to FIG. 4 and FIG. 5, in the couple-in lens assembly 100, the image on the edge of the viewing angle may experience the most distortion, whereas in FIG. 4, even when the viewing angle reaches 25° on the edge (a complete viewing angle is 50°, which can be interpreted as 25° on each side), the optical distortion of the image remains as low as 0.78%, and the TV distortion is only 0.42%. Moreover, distortion (namely, deviation between the grids and the axes) rarely occurs on the edge in FIG. 5, indicating that the image displayed by the couple-in lens assembly 100 barely experiences distortion.

Figure 6:
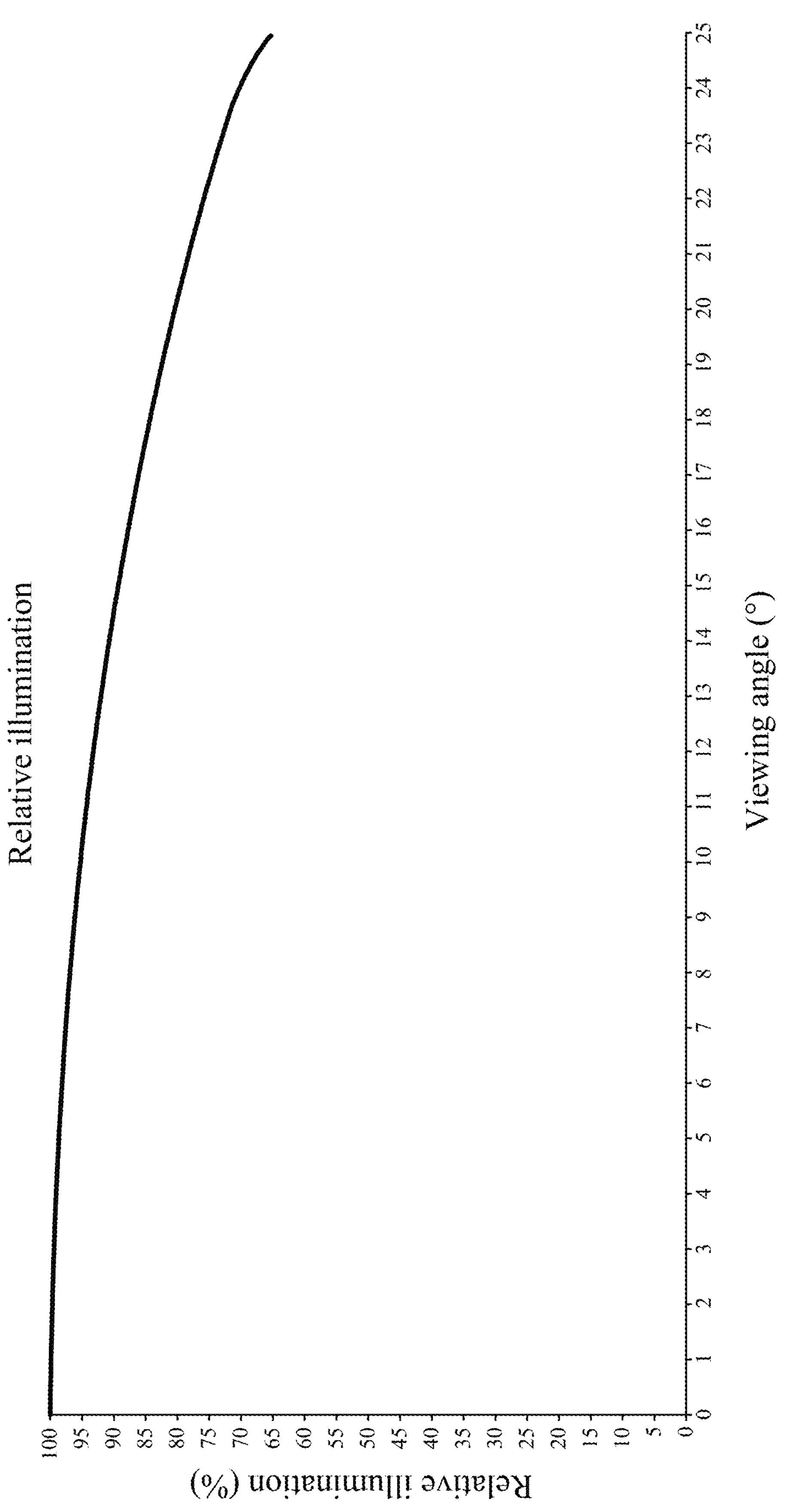
FIG. 6 is a relative illumination-viewing angel relationship diagram of the couple-in lens assembly of FIG. 1.

FIG. 6 is a relative illumination-viewing angel relationship diagram of the couple-in lens assembly 100 of FIG. 1. Relative illumination (RI) is defined as a percentage of a peripheral illumination to a central illumination of a field of view. According to the law implied by $\cos^4(\theta)$, as the light receiving angle of the lens increases, the relative illumination of the edge field of view gets lower. According to FIG. 5, the relative illumination of the couple-in lens assembly 100 on the edge (viewing angle of) 25° is not lower than 64%, suggesting enough peripheral illumination of the couple-in lens assembly 100.

Figure 7:
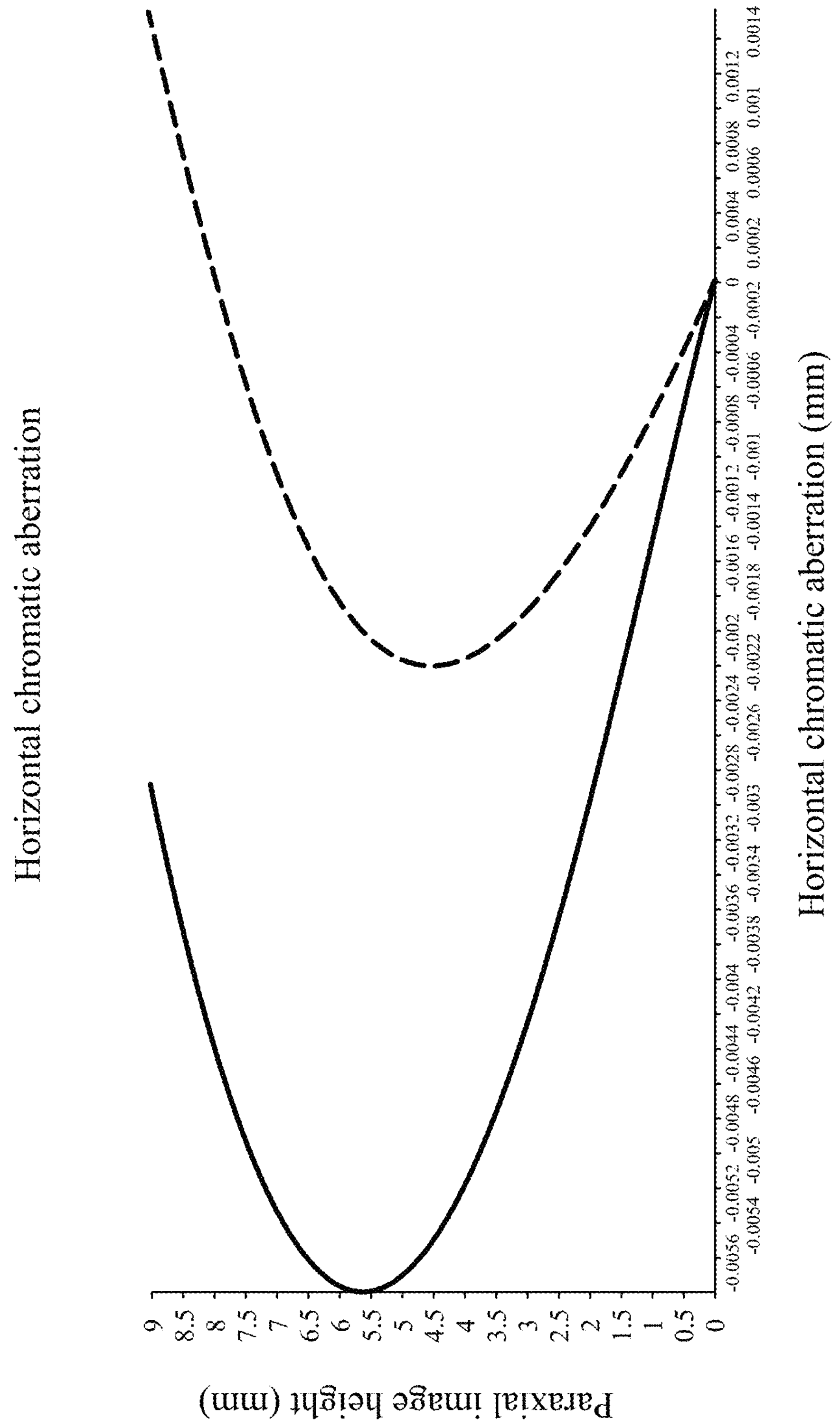
FIG. 7 is a paraxial image height-lateral chromatic aberration diagram of the couple-in lens assembly of FIG. 1.

FIG. 7 is a paraxial image height-lateral chromatic aberration diagram of the couple-in lens assembly 100 of FIG. 1. Referring to FIG. 7, since light rays varying in wavelength correspond to different refractive indexes, the difference between the image heights of the main light rays of two off-axis colors is defined as a set of lateral chromatic aberration (said "lateral" here means the direction of image height). With respect to the design specification of the couple-in lens assembly 100, it is required that the lateral chromatic aberration be less than the size of 1 pixel of the light source 310 (referring to FIG. 1) assisting in display, to avoid color offset detected on a sensor or observed by human eyes. The couple-in lens assembly 100 in the present embodiment is designed with three wavelengths, shown in Table 1:

TABLE 1

| | Wavelength |
|---|---|
| Long wavelength | 656.72 nm |
| Reference wavelength | 587.56 nm |
| Short wavelength | 486.12 nm |

In FIG. 7, the left line represents a lateral chromatic aberration obtained by subtracting the image height of the long-wavelength light ray from the image height of the short-wavelength light ray, and the right line represents a lateral chromatic aberration obtained by subtracting the image height of the reference-wavelength light ray from the image height of the short-wavelength light ray. A third set of lateral chromatic aberration (a lateral chromatic aberration obtained by subtracting the image height of the reference-wavelength light ray from the image height of the long-wavelength light ray) is represented by a difference between the two curves. In the present embodiment, the three lateral chromatic aberrations do not exceed 5.8 μm (0.0058 mm) at most, whereas the pixels of conventional micro-LED displays are all beyond such figure. The couple-in lens assembly 100 of FIG. 2 can be extensively applied to various head-mounted displays.

Figure 8:
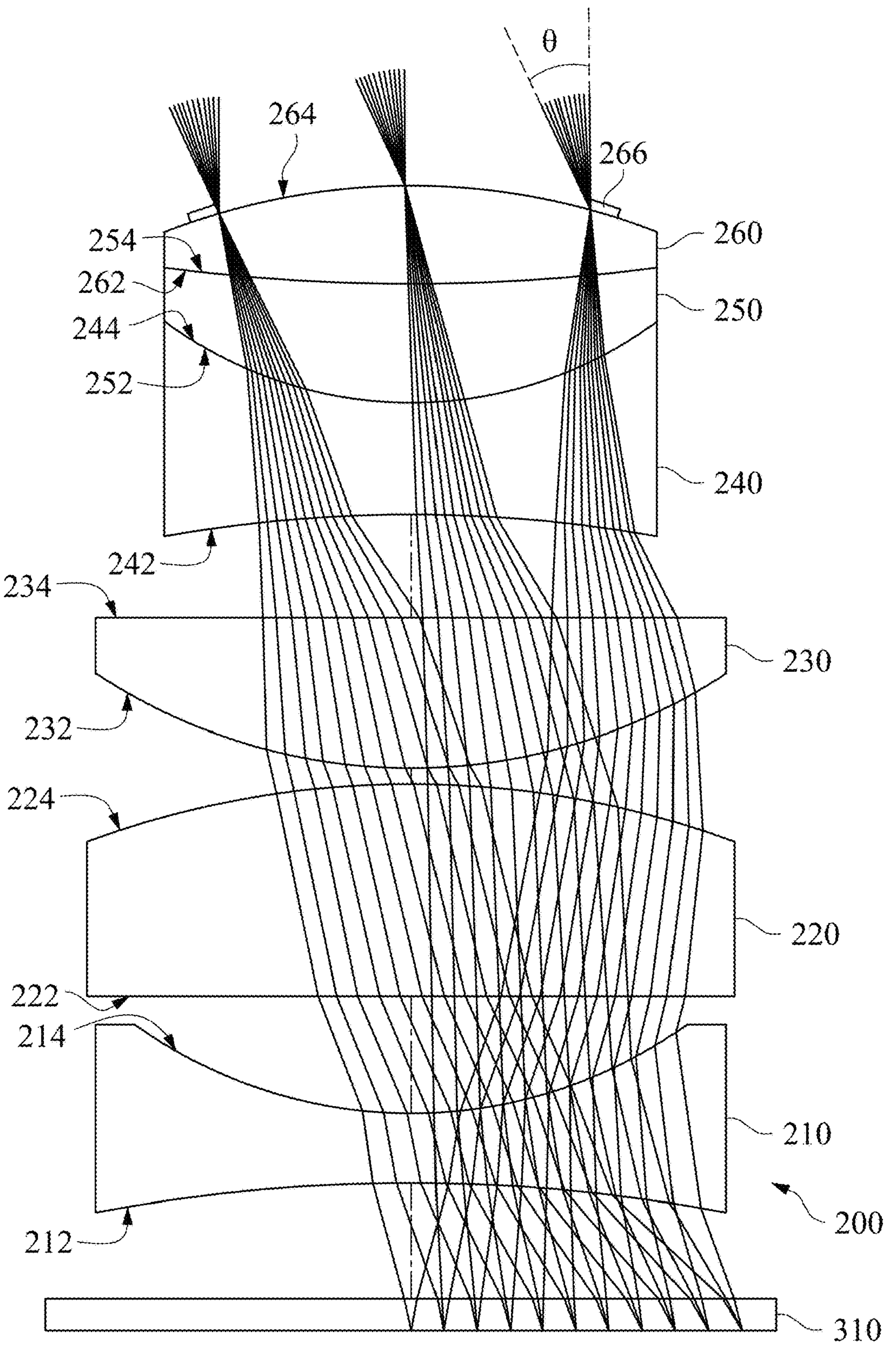
FIG. 8 is a partial enlarged view illustrating a couple-in lens assembly and a light source according to another embodiment of the present disclosure.

FIG. 8 is a partial enlarged view illustrating a couple-in lens assembly 200 and a light source 310 according to another embodiment of the present disclosure. Referring to FIG. 8, a couple-in lens assembly 200 includes a first lens 210, a second lens 220, a third lens 230, a fourth lens 240, a fifth lens 250 and a sixth lens 260. The first lens 210 has a spherical first surface 212 and a second surface 214. The second lens 220 has a spherical third surface 222 and a fourth surface 224, and is located above the second surface 214 of the first lens 210. The third lens 230 has a spherical fifth surface 232 and a spherical sixth surface 234, and is located above the fourth surface 224 of the second lens 220. The fourth lens 240 has a spherical seventh surface 242 and a spherical eighth surface 244, and is located above the sixth surface 234 of the third lens 230. The fifth lens 250 has a spherical ninth surface 252 and a tenth surface 254, where the ninth surface 252 of the fifth lens 250 is attached to the eighth surface 244 of the fourth lens 240. The sixth lens 260 has a spherical eleventh surface 262 and a twelfth surface 264, where the eleventh surface 262 of the sixth lens 260 is attached to the tenth surface 254 of the fifth lens 250. In addition, the couple-in lens assembly 200 further includes an aperture 266. The aperture 266 is disposed and attached on the twelfth surface 264. With such design, the couple-in lens assembly 200 can obtain a larger amount of light input in the same dimension. The couple-in lens assembly 200 may also have a viewing angle of 50° (two times the viewing angle θ) as the above-mentioned couple-in lens assembly 100.

In some embodiments, the first lens 210 includes a divergent lens. The second lens 220 includes a convergent lens. The third lens 230 includes a convergent lens. In addition, the eighth surface 244 has the same curvature radius as the ninth surface 252, and the tenth surface 254 has the same curvature radius as the eleventh surface 262. Therefore, they can be bonded to form an achromatic lens capable of correcting chromatic aberration. Thus, the fourth lens 240, the fifth lens 250 and the sixth lens 260 form a first lens assembly, and the first lens assembly includes a divergent lens. In addition, the second surface 214 has a smaller curvature radius than the third surface 222.

Figure 9:
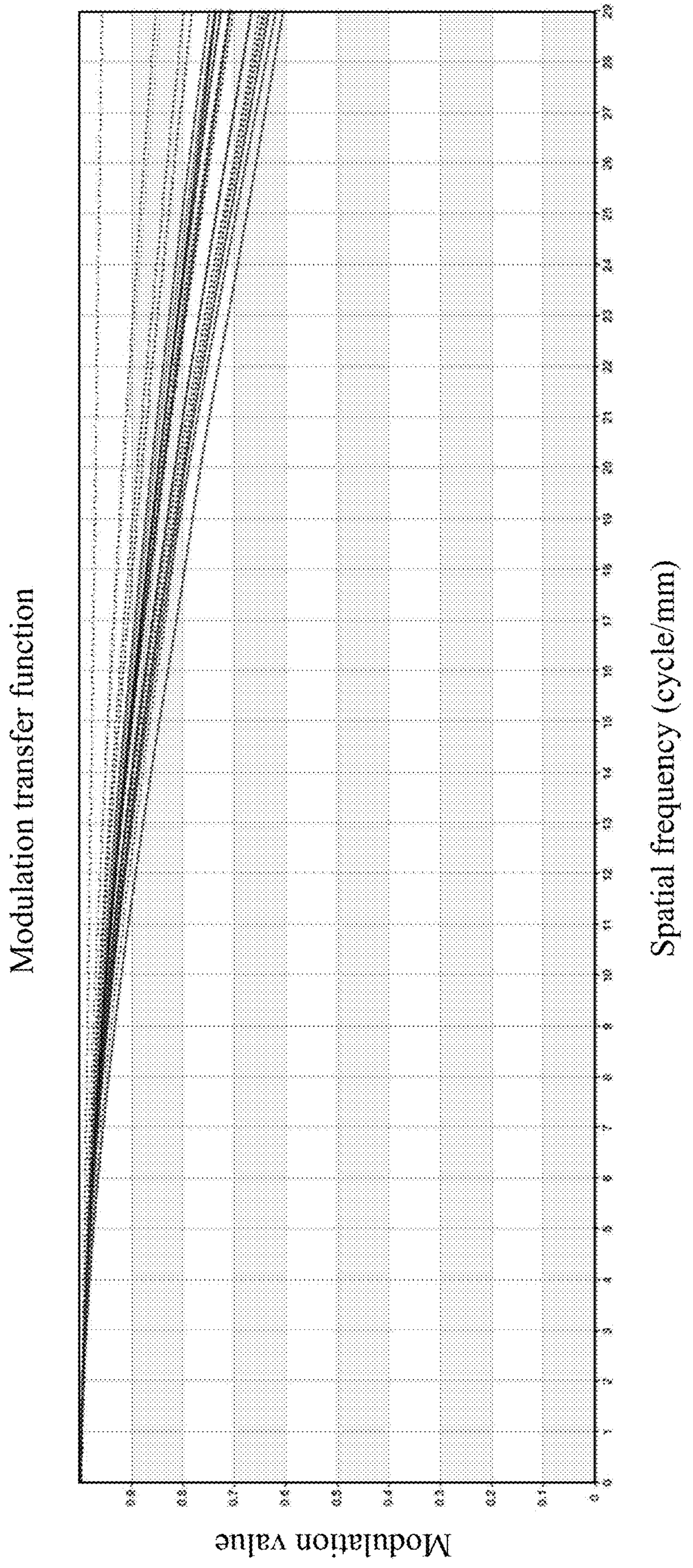
FIG. 9 is a graph illustrating a modulation transfer function of the couple-in lens assembly of FIG. 8.

FIG. 9 is a graph illustrating a modulation transfer function of the couple-in lens assembly 200 of FIG. 8. The horizontal axis represents spatial frequency, and the longitudinal axis represents modulation value. Multiple dashed lines drawn in FIG. 8 represent modulation values in the tangential direction or sagittal direction of different viewing angles within 25°. In this figure, in the tangential direction or sagittal direction of whichever angle within the viewing angle of 25°, the modulation value is not less than 0.6, suggesting a significantly high image resolution.

Figure 10:
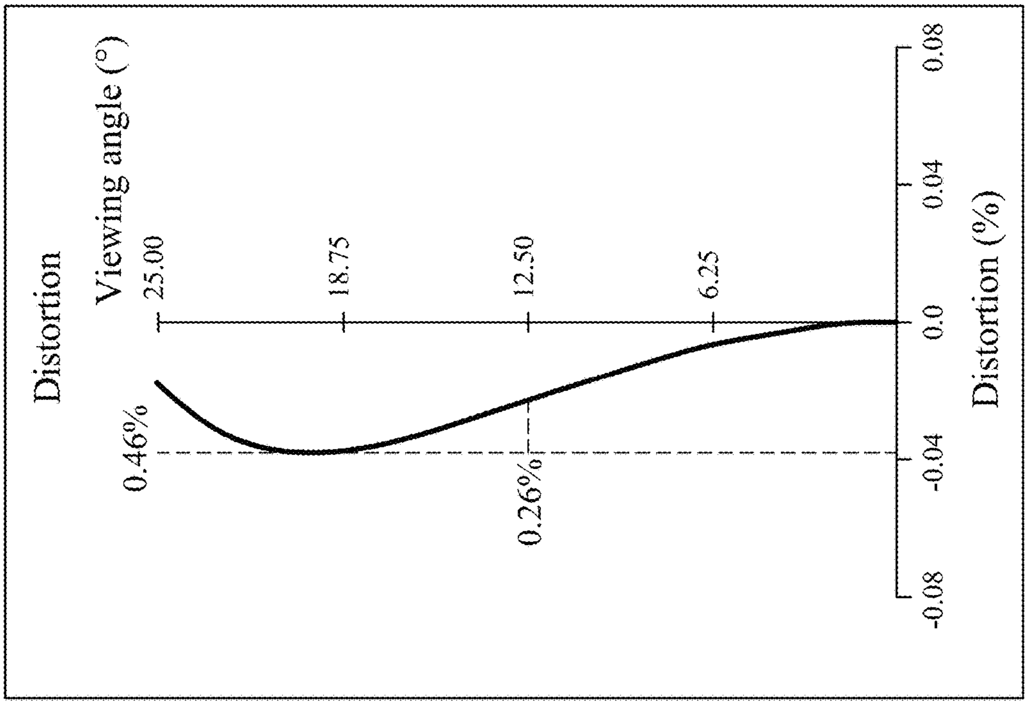
FIG. 10 is a distortion curve-viewing angle relationship diagram of the couple-in lens assembly of FIG. 8.
Figure 11:
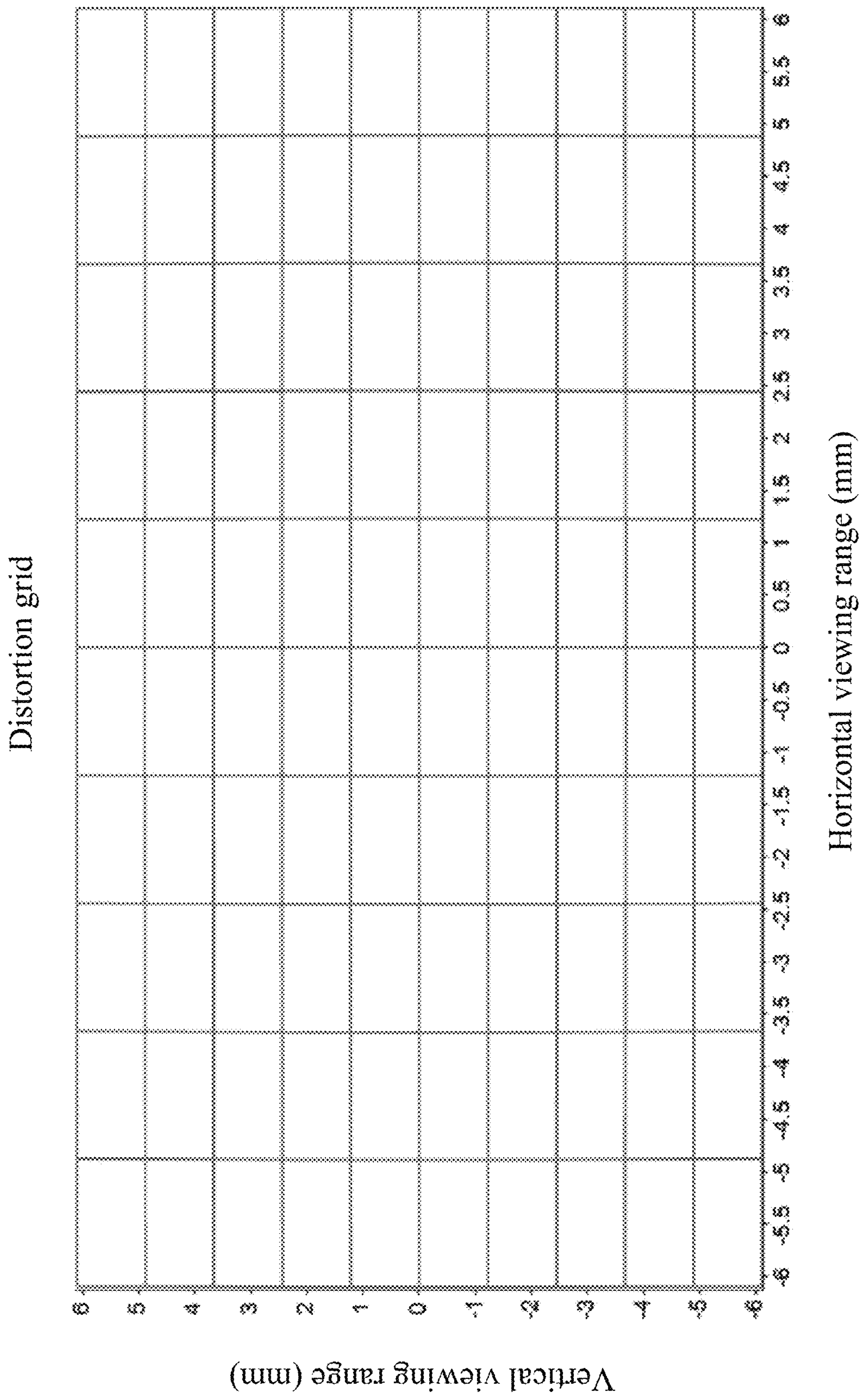
FIG. 11 is a distortion grid diagram of the couple-in lens assembly of FIG. 8.

FIG. 10 is a distortion curve-viewing angle relationship diagram of the couple-in lens assembly 200 of FIG. 8. FIG. 11 is a distortion grid diagram of the couple-in lens assembly 200 of FIG. 8. In FIG. 10, even when the viewing angle reaches 25° on the edge (a complete viewing angle is 50°, which can be interpreted as 25° on each side), the optical distortion of the image remains as low as 0.46%, and the TV distortion is only 0.26%. Moreover, distortion (namely, deviation between the grids and the axes) rarely occurs on the edge in FIG. 11, indicating that the image displayed by the couple-in lens assembly 200 barely experiences distortion.

Figure 12:
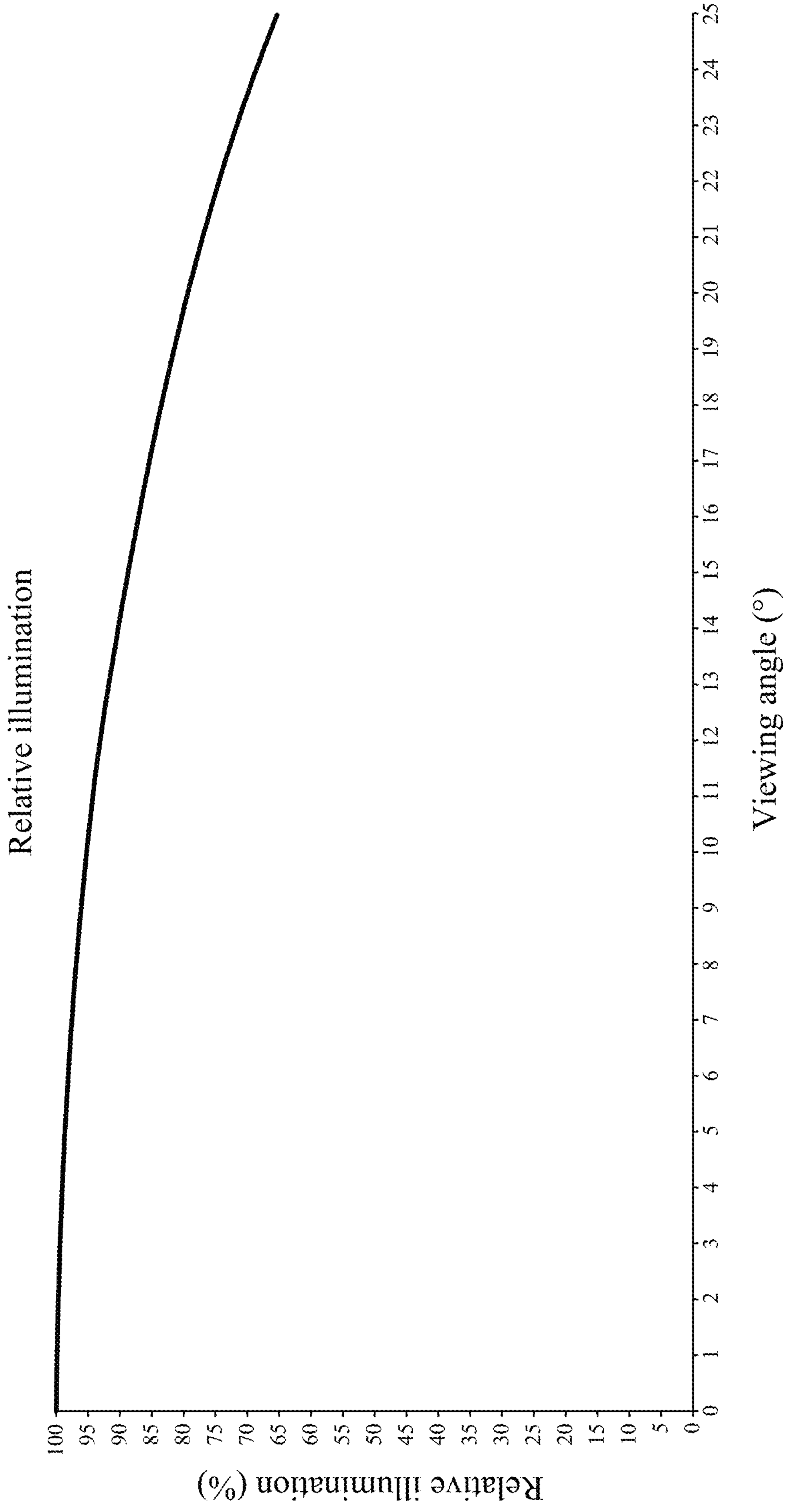
FIG. 12 is a relative illumination-viewing angel relationship diagram of the couple-in lens assembly of FIG. 8.

FIG. 12 is a relative illumination-viewing angel relationship diagram of the couple-in lens assembly 200 of FIG. 8. According to FIG. 12, the relative illumination of the couple-in lens assembly 200 on the edge (viewing angle of 25°) is not lower than 64%, suggesting enough peripheral illumination of the couple-in lens assembly 200.

Figure 13:
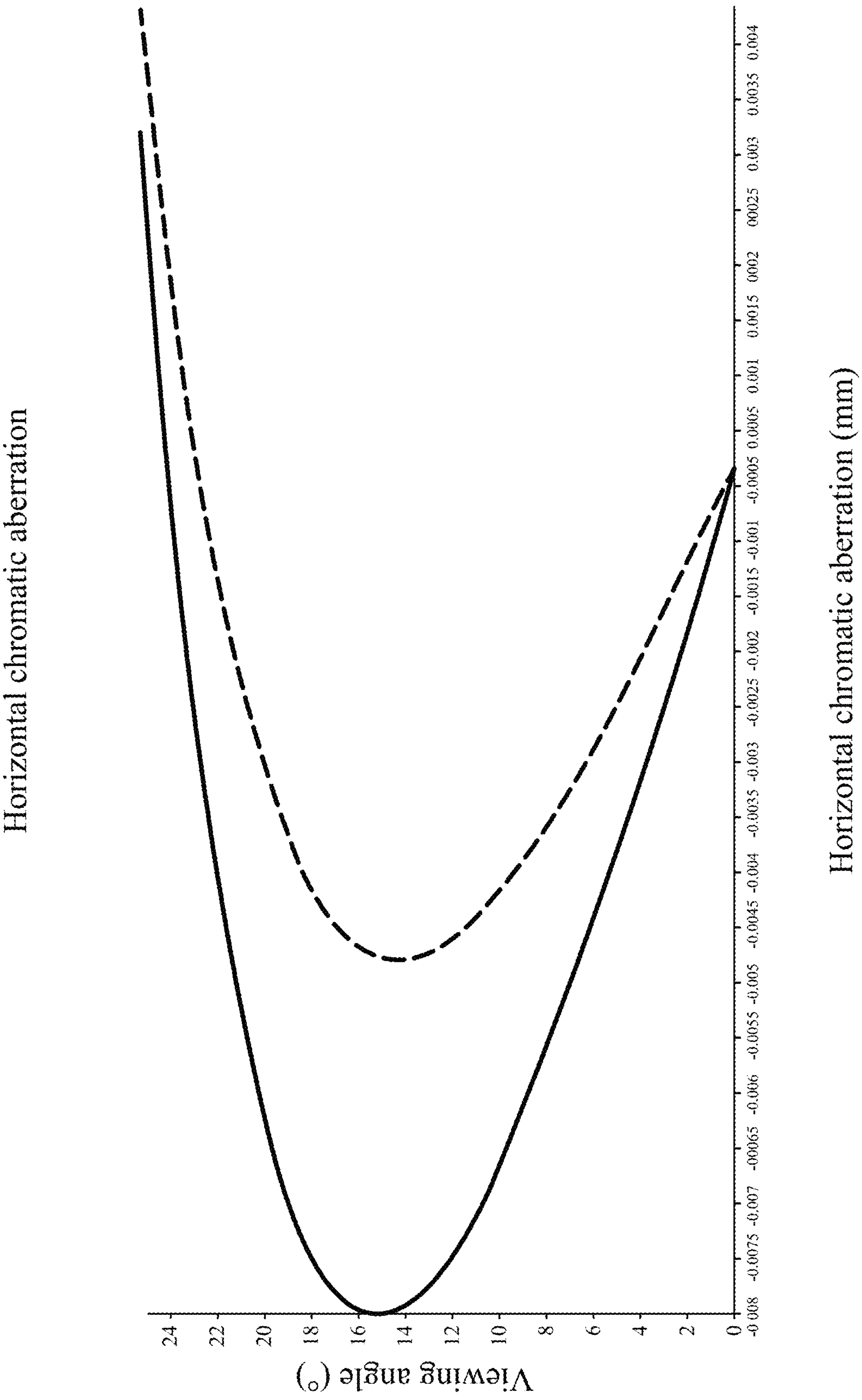
FIG. 13 is a viewing angle-lateral chromatic aberration diagram of the couple-in lens assembly of FIG. 8.

FIG. 13 is a viewing angle-lateral chromatic aberration diagram of the couple-in lens assembly 200 of FIG. 8. In FIG. 13, the left line represents a lateral chromatic aberration obtained by subtracting the image height of the long-wavelength light ray from the image height of the short-wavelength light ray, and the right line represents a lateral chromatic aberration obtained by subtracting the image height of the reference-wavelength light ray from the image height of the short-wavelength light ray. The "short wavelength", "reference wavelength" and "long wavelength" here are the same as in Table 1. In the present embodiment, the three lateral chromatic aberrations do not exceed 8 μm (0.008 mm) at most, whereas the pixels of conventional micro-LED displays are all beyond such figure, indicating that the couple-in lens assembly 200 of FIG. 8 can be extensively applied to various head-mounted displays.

The features of several embodiments are outlined above so that those skilled in the art can better understand the aspects of the present disclosure. Those skilled in the art should understand that they can easily use the present disclosure as a basis for designing or modifying other processes and structures, to realize the same purposes and/or advantages as those of the embodiments described herein. Those skilled in the art should also recognize that such equivalent construction does not depart from the spirit and scope of the present disclosure, and various alterations, substitutions and changes can be made thereto without departing from the spirit and scope of the present disclosure.

What is claimed is:

1. A couple-in lens assembly, comprising:

a first lens, having a spherical first surface and a spherical second surface;

a second lens, having a spherical third surface and a spherical fourth surface, and located above the second surface of the first lens;

a third lens, having a spherical fifth surface and a spherical sixth surface, wherein the fifth surface of the third lens is attached to the fourth surface of the second lens;

a fourth lens, having a spherical seventh surface and a spherical eighth surface, and located above the sixth surface of the third lens;

a fifth lens, having a spherical ninth surface and a spherical tenth surface, and located above the eighth surface of the fourth lens;

a sixth lens, having a spherical eleventh surface and a spherical twelfth surface, wherein the eleventh surface of the sixth lens is attached to the tenth surface of the fifth lens;

a seventh lens, having a spherical thirteenth surface and a spherical fourteenth surface, and located above the twelfth surface of the sixth lens;

an eighth lens, having a spherical fifteenth surface and a spherical sixteenth surface, and located above the fourteenth surface of the seventh lens;

a ninth lens, having a spherical seventeenth surface and a spherical eighteenth surface, wherein the seventeenth surface of the ninth lens is attached to the sixteenth surface of the eighth lens; and an aperture, disposed and attached on the eighteenth surface.

2. The couple-in lens assembly of claim 1, wherein the first lens comprises a divergent lens.

3. The couple-in lens assembly of claim 1, wherein the fourth lens comprises a convergent lens.

4. The couple-in lens assembly of claim 1, wherein the seventh lens comprises a convergent lens.

5. A couple-in lens assembly, comprising:

a first lens, having a spherical first surface and a spherical second surface;

a second lens, having a spherical third surface and a spherical fourth surface, and located above the second surface of the first lens;

a third lens, having a spherical fifth surface and a spherical sixth surface, and located above the fourth surface of the second lens;

a fourth lens, having a spherical seventh surface and a spherical eighth surface, and located above the sixth surface of the third lens;

a fifth lens, having a spherical ninth surface and a spherical tenth surface, wherein the ninth surface of the fifth lens is attached to the eighth surface of the fourth lens;

a sixth lens, having a spherical eleventh surface and a spherical twelfth surface, wherein the eleventh surface of the sixth lens is attached to the tenth surface of the fifth lens; and an aperture, disposed and attached on the twelfth surface.

6. The couple-in lens assembly of claim 5, wherein the first lens comprises a divergent lens.

7. The couple-in lens assembly of claim 5, wherein the second lens comprises a convergent lens.

8. The couple-in lens assembly of claim 5, wherein the third lens comprises a convergent lens.

* * * * *